US006453179B1

(12) United States Patent
Larsen

(10) Patent No.: US 6,453,179 B1
(45) Date of Patent: Sep. 17, 2002

(54) USER INTERFACE FOR A RADIO TELEPHONE

(75) Inventor: Flemming Klovborg Larsen, Copenhagen (DK)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/534,736

(22) Filed: Mar. 27, 2000

Related U.S. Application Data

(63) Continuation of application No. 08/975,126, filed on Nov. 20, 1997, now Pat. No. 6,363,259.

(30) Foreign Application Priority Data

Nov. 22, 1996 (GB) .............................................. 9624520

(51) Int. Cl.[7] ................................................ H04B 1/38
(52) U.S. Cl. ....................................... 455/566; 455/90
(58) Field of Search ................................. 455/550, 566, 455/575, 90, 403

(56) References Cited

U.S. PATENT DOCUMENTS

| 4,117,452 A | | 9/1978 | Klausner et al. ............ 364/900 |
|---|---|---|---|
| 5,396,264 A | * | 3/1995 | Falcone et al. ............. 345/146 |
| 5,422,656 A | | 6/1995 | Allard et al. ............... 345/173 |
| 5,479,476 A | | 12/1995 | Finke-Anlouff .............. 379/58 |
| 5,542,103 A | | 7/1996 | Mottier et al. ................ 455/89 |
| 5,584,054 A | | 12/1996 | Tyneski et al. ............... 455/89 |
| 5,594,778 A | | 1/1997 | Schaupp, Jr. et al. ......... 379/58 |
| 5,633,912 A | | 5/1997 | Tsoi ............................ 379/58 |
| 5,758,295 A | * | 5/1998 | Ahlberg et al. ............. 455/566 |
| 5,799,292 A | * | 8/1998 | Hekmatpour ................ 706/11 |
| 5,812,954 A | | 9/1998 | Henriksson ................. 455/450 |
| 5,819,175 A | | 10/1998 | Niemi ........................ 455/418 |
| 5,852,783 A | * | 12/1998 | Tabe et al. .................. 455/550 |
| 5,870,683 A | | 2/1999 | Wells et al. ................. 455/566 |
| 5,884,185 A | | 3/1999 | Kim ........................... 455/550 |
| 5,887,264 A | | 3/1999 | Kohler ........................ 455/461 |
| 5,892,475 A | | 4/1999 | Mikko ........................ 345/352 |
| 5,966,671 A | * | 10/1999 | Mitchell et al. ............. 455/575 |

(List continued on next page.)

FOREIGN PATENT DOCUMENTS

| DE | 296 11 274 | 11/1996 |
|---|---|---|
| EP | 0 279 233 A2 | 8/1988 |
| EP | 0 540 147 A2 | 5/1993 |
| EP | 0 588 210 A1 | 3/1994 |
| EP | 0 633 684 A2 | 6/1994 |
| EP | 0 679 003 A2 | 4/1995 |
| EP | 0 685 953 A1 | 12/1995 |
| GB | 2 278 758 A | 12/1994 |
| WO | WO 95/25397 | 9/1995 |

OTHER PUBLICATIONS

Search Report from UK Patent Office dated Mar. 7, 1997.
Patent Abstracts of Japan, Publication No. 08251266, Publication Date: Sep. 27, 1996, Title: Portable Information Equipment and Radio Communication System Using The Portable Information Equipment.

Primary Examiner—Dwayne Bost
Assistant Examiner—Joy K. Contee
(74) Attorney, Agent, or Firm—Perman & Green, LLP

(57) ABSTRACT

A radiophone comprises a user interface and a controller unit connected to the user interface. The user interface i.e. comprises a display and a keypad having at least one operation key whose function is controlled by the controller nut and is displayed in a predetermined area of the display. The function of said at last one operation key is displayed in a predetermined area of the display. The radiophone is capable of assuming a plurality of states in which a group of predetermined actions associated with the state concerned may be performed by said at least one operation key. The controller unit displays one of said group of actions as a default function in the predetermined area of the display.

23 Claims, 8 Drawing Sheets

U.S. PATENT DOCUMENTS

| | | | |
|---|---|---|---|
| 5,982,875 A | 11/1999 | Lieben et al. | 379/350 |
| 6,081,730 A | 1/2000 | Lieben et al. | 455/557 |
| 6,026,161 A * | 2/2000 | Larsen et al. | 379/433 |
| 6,035,189 A | 3/2000 | Ali-Vehmas et al. | 455/414 |
| 6,122,530 A | 9/2000 | Overy et al. | 455/566 |
| 6,144,863 A * | 11/2000 | Charron | 455/566 |
| 6,195,569 B1 * | 2/2001 | Frederiksen | 455/566 |

* cited by examiner

USER INTERFACE FOR A RADIO TELEPHONE

CROSS REFERENCE TO RELATED APPLICATIONS

This application is a continuation of application Ser. No. 08/975,126, filed on Nov. 20, 1997, now U.S. Pat. No. 6,363,259.

BACKGROUND OF THE INVENTION

The invention concerns a radiophone having a user interface comprising a display and a keypad including at least one operation key whose function is controlled by a controller unit and is displayed in a predetermined area of said display.

The term "radiophone" covers a portable or mobile unit which, with a transmitter/receiver, is capable of transmitting signals with speech or data via electromagnetic waves/radio waves to another unit comprising a transmitter/receiver.

It is required by the users that the size of radiophones, e.g. in the form of portable telephones, be minimized, since this will make them easier to carry and to handle. This necessarily means that the area on the front of the telephone will be reduced, and since it is the front which forms the basis for the major part of the Man-Machine-Interface (MMI), this will be reduced correspondingly. The user interface comprises a keypad for entering instructions, a display for displaying information, and a microphone as well as an earpiece for picking up and emitting sound signals.

The last five to ten years have seen a tremendous development in such telephones, where more and more features have become accessible in the telephones—without a corresponding change in the interface. The extent to which these features is used, varies much from user to user.

SUMMARY OF THE INVENTION

In accordance with the present invention there is provided a radiophone comprising a user interface and a control unit connected to the user interface, said user interface comprising a display and a keypad having at least one operation key whose function is controlled by the controller unit and is displayed in a predetermined part of said display, said radiophone being capable of assuming a plurality of states in which a group of predetermined actions associated with the state concerned may be performed by means of said at least one operation key, said controller unit displaying an action from said group of actuibs as a default function. The operation key or the soft key is hereby presented as default to perform an active action e.g. with the data which have been fetched from the memory of the telephone or have been input to the main area of the display. As default, this active action may be to make a call, while alternative functions may then be to save a telephone number in the phonebook, to edit it, to erase it, etc.

The invention provides a user interface for a radiophone which facilitates the normal operation, without this being at the expense of the amount of features.

Further, the radiophone may advantageously be provided with a scroll key by means of which the user may selectively jump to the preceding or succeeding item at the location concerned in the menu loop. In a preferred embodiment of the invention, the controller unit also redefines the function of the scroll key from scrolling between several items in a menu to switching from the default function to the group of functions to which the default function belongs. It is noted that, in the preferred embodiment, the scroll key toggles between the default function and the group of functions (options), but switches between items in the function group once this has been selected by means of the operation key. The default function is included here at the same level as the other functions in the group.

So far, the possible functions have been treated in a co-ordinated manner to a great extent, but the provision of a default option, which covers the major part of the activities which the user normally performs, will make it easier for the users to perform standard actions, without making the special actions more difficult to perform, since these are achieved via the group of possible functions. This ensures that when data are input to the main area of the display, an action may be performed on these data merely by a single manipulation of the operation key, which is a multi-function key. In the past, this was feasible only through the use of mono-function keys, such as "on-hook" and "off-hook".

This means e.g. that the operation key, which is frequently referred to as a soft key since its function is not fixed, but may vary according to the state concerned, enables a call to be established by a single depression of the operation key when a telephone number is present in the display.

In addition to redefining the functions of the operation key and the scroll key in the preferred embodiment, the controller unit may also advantageously redefine the function of the erase key, so that the erase key, during a telephone call and when detecting an incoming call, changes its function from erasing entered characters to interrupting the ongoing call or to rejecting the incoming call or to diverting it to a voice mail box.

If the user decides to make a call by means of the operation key, the phone changes its state to a "call established" state when the call has been established, and then the new default function of the operation key will be to terminate the call. This means that another activation of the operation key will terminate the call. If a conference call is to be established, this is done by means of the scroll key via the group of possible functions associated with the state concerned.

It should be noted that said at least one operation key may comprise two or more keys whose default function changes when the state changes. Further, nothing prevents said at least one operation key from being integrated with said predetermined area(s) of the display as keys in a touch-sensitive display.

BRIEF DESCRIPTION OF THE DRAWINGS

The invention will be explained more fully below in connection with a preferred embodiment and with reference to the drawing, in which.

DETAILED DESCRIPTION OF THE INVENTION

Figure 1:
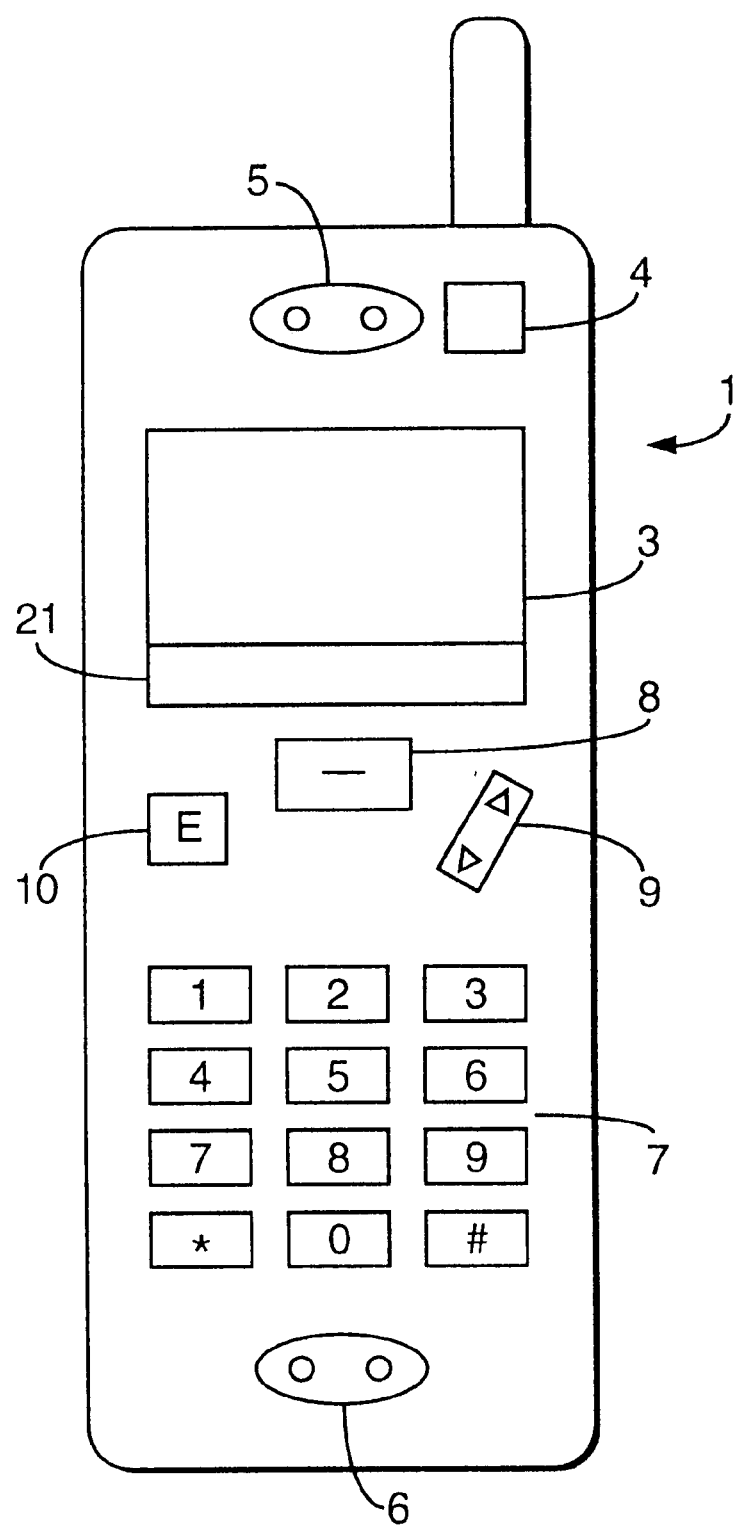
FIG. 1 shows a preferred embodiment of a portable telephone having a user interface in accordance with the invention.

FIG. 1 shows a preferred embodiment of a radiophone according to the invention, and it will be seen that the telephone, which is generally designed by 1, comprises a user interface having a keypad 2, a display 3, an on/off button 4, an earpiece 5, and a microphone 6. The keypad 2 has a first group 7 of keys in the form of alpha-numerical keys, by means of which the user can enter a telephone number, write a text message (SMS), write a name (associated with the telephone number), etc. The user uses the first group of keys primarily for entering data in the telephone (entry events).

The keypad 2 additionally comprises a second group of keys which, in the preferred embodiment, comprises precisely one operation key 8 or soft key whose function depends on the present state of the telephone. The default function or the present function of the operation key 8 is displayed in a predetermined area 21 of the display 3. In the preferred embodiment, the second group of keys additionally comprises a scroll key 9 by means of which the user can jump selectively from one item to the preceding or the succeeding item in the menu loop of the telephone, while he gets access to a submenu loop under the item concerned in the main menu loop by activation of the operation key. The clear key 10 may be used e.g. for erasing the digit or letter entered last by brief depression, while depression of a longer duration will erase the entire number or word. Like the operation key 8, the scroll key 9 and the clear key 10 may advantageously be redefined in some states, which appears from the following.

Figure 3:
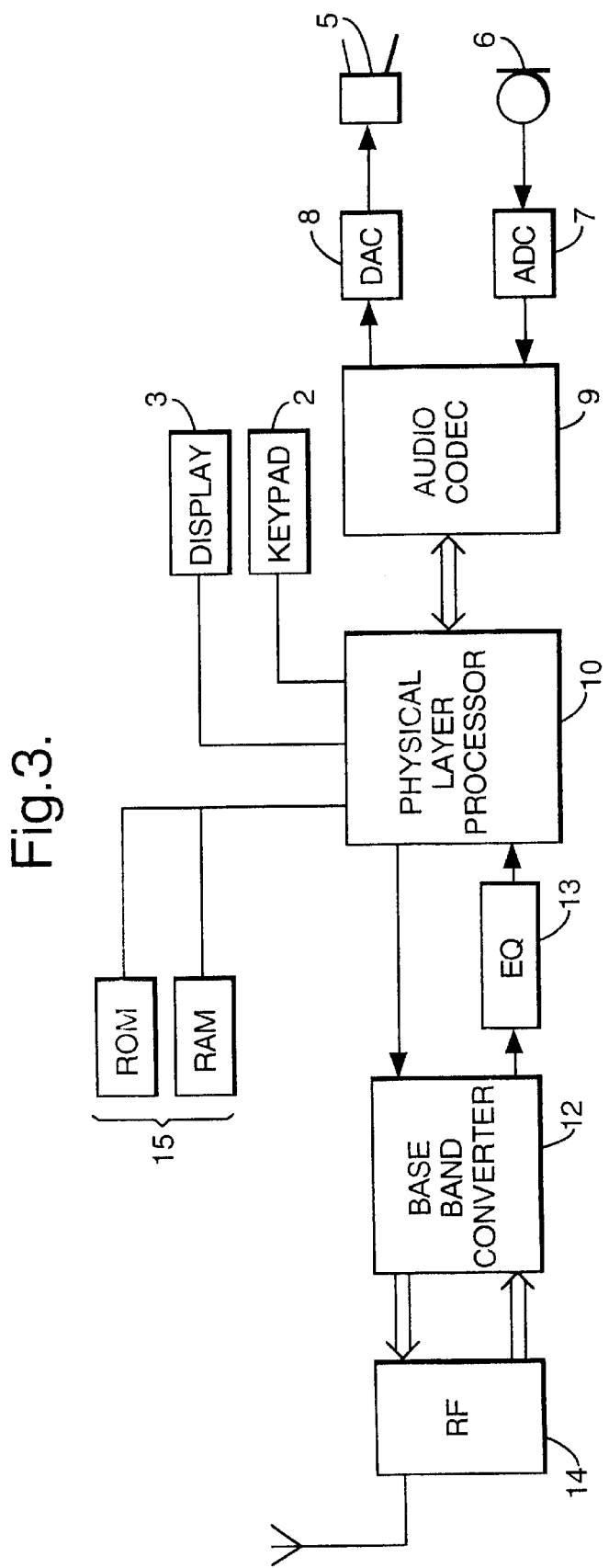
FIG. 3 schematically shows the hardware parts of a portable telephone which are essential to the understanding of the invention.

FIG. 3 schematically shows the most important parts of a preferred embodiment of a portable telephone, said parts being essential to the understanding of the invention. The preferred embodiment of the telephone of the invention is adapted for use in connection with the GSM network, but, of course, the invention may also be applied in connection with other telephone networks, such as cellular networks and various forms of cordless telephone systems. The microphone 6 records the user's speech, and the analog signals formed thereby are A/D converted in an A/D converter 7 before the speech is encoded in an audio codec unit 9. The encoded speech signal is transferred to a physical layer processor 10, which i.e. supports the GSM terminal software. The processor 10 also forms the interface to the peripheral units 15 of the apparatus, including the display 3 and the keypad 2 (as well as SIM, data, power supply, RAM, ROM, etc.). The processor 10 communicates with the RF part 14 via a baseband converter 12 and a channel equalizer 13. The audio codec unit 9 speech-decodes the signal, which is transferred from the processor 10 to the earpiece 5 via a D/A converter 8. The units 7–13 are usually integrated in a chip set, an example of such a commercially available chip set being AD20msp410 GSM from Analog Devices with associated protocol software from The Technology Partnership (TTP).

The processor 10, which serves as the controller unit in a manner known per se in the preferred embodiment, is connected to the user interface. Thus, it is the processor which monitors the activity in the telephone and controls the display 3, 21 in response thereto. Therefore, it is the processor 10 which detects the occurrence of a state change event and changes the state of the telephone and thus the display text. A state change event may be caused by the user when he activates the keypad, which is called an entry event, and also by the network connection of the telephone or by another event beyond the user's control, which is called a non user event. Non user events comprise status change during call set-up, change in battery voltage, change in antenna conditions, message on reception of SMS, etc.

Figure 2:
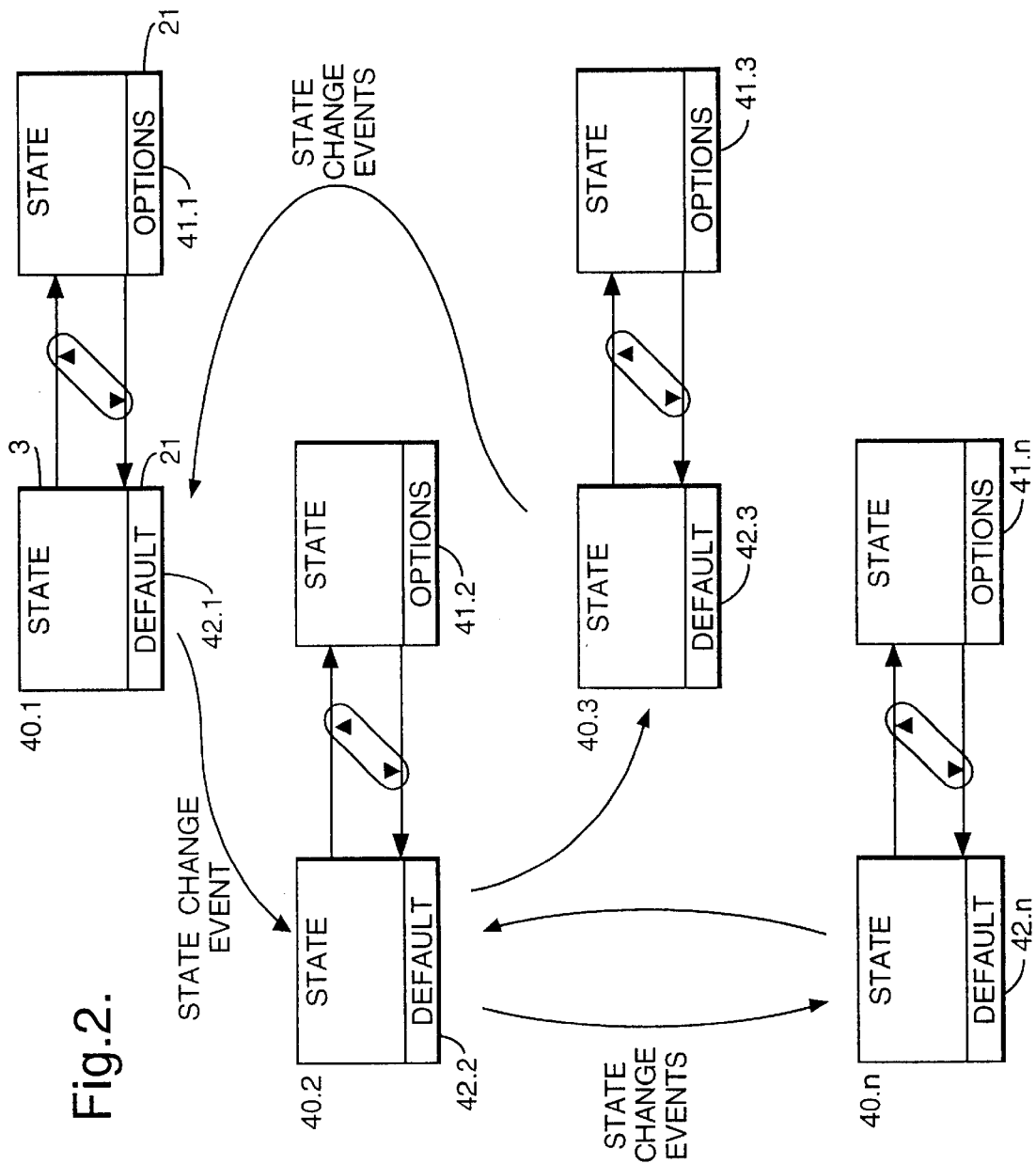
FIG. 2 shows switching between the states of the telephone.

The invention is based on the idea that the telephone can assume a plurality of predetermined states 40.1–40.n, which is illustrated in FIG. 2. A plurality of actions (options 41.1–41.n) may be performed in these states 40.1–40.n. The display image at arrival to state 40.1 may be a telephone number or the name of a person contained in the phonebook of the telephone, which is indicated by "state". "State" might also cover "incoming calls", "E-mail received", "SMS received", etc. If the display contains a telephone number, the default function 42.1–42.n might be "call". The scroll key 8 allows switching from the default function to the group of possible functions, to which the default function belongs. It is noted that, in the preferred embodiment, the scroll key 8 toggles between the default function and the group of possible functions (options), but switches between items in the group of possible functions, once this group has been selected by means of the operation key. The state is maintained during toggling and scrolling through the options.

As will be seen from FIG. 2, a state change event will result in a change from one state to another. The new state depends on the old state and the nature of the state change event. During an established call ("call established" state), the default function of the operation key 8 will according to the preferred embodiment be "end". If a new incoming call "is waiting", the user may use the scroll key 9 to produce the option list including items such as "end", "join", "answer" and "swap" without interrupting the call.

Each state 40.1–40.n is associated with a predefined group of functions, actions or options 41.1–41.n, which are possible precisely for that state. Establishment of conference calls, e.g., can be performed only when a call has already been established. A preferred function serving as the default function 42.1–42.n is designated in each of these groups. This designation may be performed by the programmer during programming, by the user through his redefinition of the default function, or by the telephone itself in that it records the frequency of the use of the individual functions and appoints the most frequently used one in each group as the default function—optionally with the user's acceptance.

When the telephone changes its state, the operation key can perform the default function if it is activated, and the user may toggle between the default function and the whole group of options by means of the scroll key. If the group of options is selected with the operation key, the user will be able to scroll through the group of options with the scroll key and to select the desired (designated) function with the operation key.

When a function is selected with the operation key, the processor 10 runs the associated program sequence to execute the function.

Figure 4:
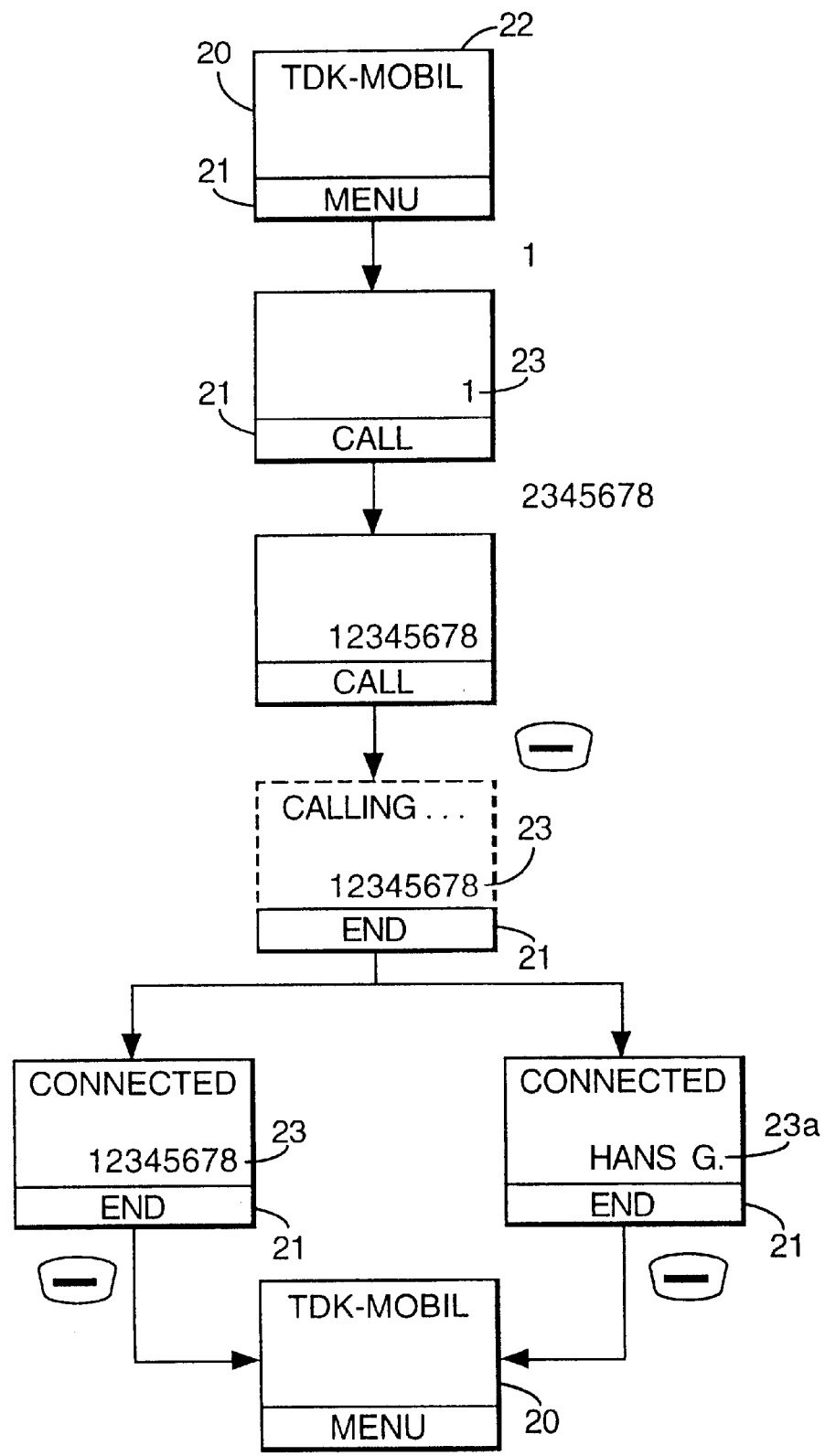
FIG. 4 shows a sequence of display images in connection with call establishment.

FIG. 4 shows the display text with simultaneous indication of the keys of the keypad which have been activated. The display 3 has a display image 20 ("idle mode" state)

which shows the function of the soft key 8 as a highlighted bar in a predetermined area (soft key display) 21 of the display. The function of the soft key 8 in the idle mode is access to the main menu loop of the telephone. The upper part of the display 20 shows an identification of the network operator concerned (here TDK-MOBIL). The display may additionally contain an indicator of the antenna signal strength and a battery voltage indicator. These are not shown in the figures, as they have no importance to the description of the default function.

When the user enters the FIG. 1 by means of the alphanumerical keys 7, the processor 10 records this, and the telephone then changes to a "number handling state". The default function is call establishment here, and "call" is therefore displayed in the soft key display 21. When the telephone changes from the idle mode, the operator identification disappears, while the entered digit is displayed in the main area 23 of the display image 21.

When several digits are entered, these are displayed as they are entered after the digit entered first. When the soft key 8 is activated, it is attempted to establish a call, which causes the telephone to change to a "call established state" under the control of the processor 10, and the new function "end" of the operation key 8 is now displayed in the soft key display 21. It is shown at the same time in the display that it is attempted to establish a call, which is done by the indication "calling . . .". The number to which the connection is to be established is still displayed in the main area 23 of the display.

When the call has been established, this is shown by the indication "connected" at the top of the display and by an indication of the telephone by means of which the call has been established. As will be seen from the branch, this identification may be the telephone number in the field 23 or a name code 23*a*, if the processor recognizes the number in its associated phonebook. The default function of the soft key 8 will still be "end", which is shown in the soft key display 21. If the soft key 8 is activated once more, the call will be interrupted, and the telephone will return to the "idle mode state" with the idle mode display image 20.

Figure 5:
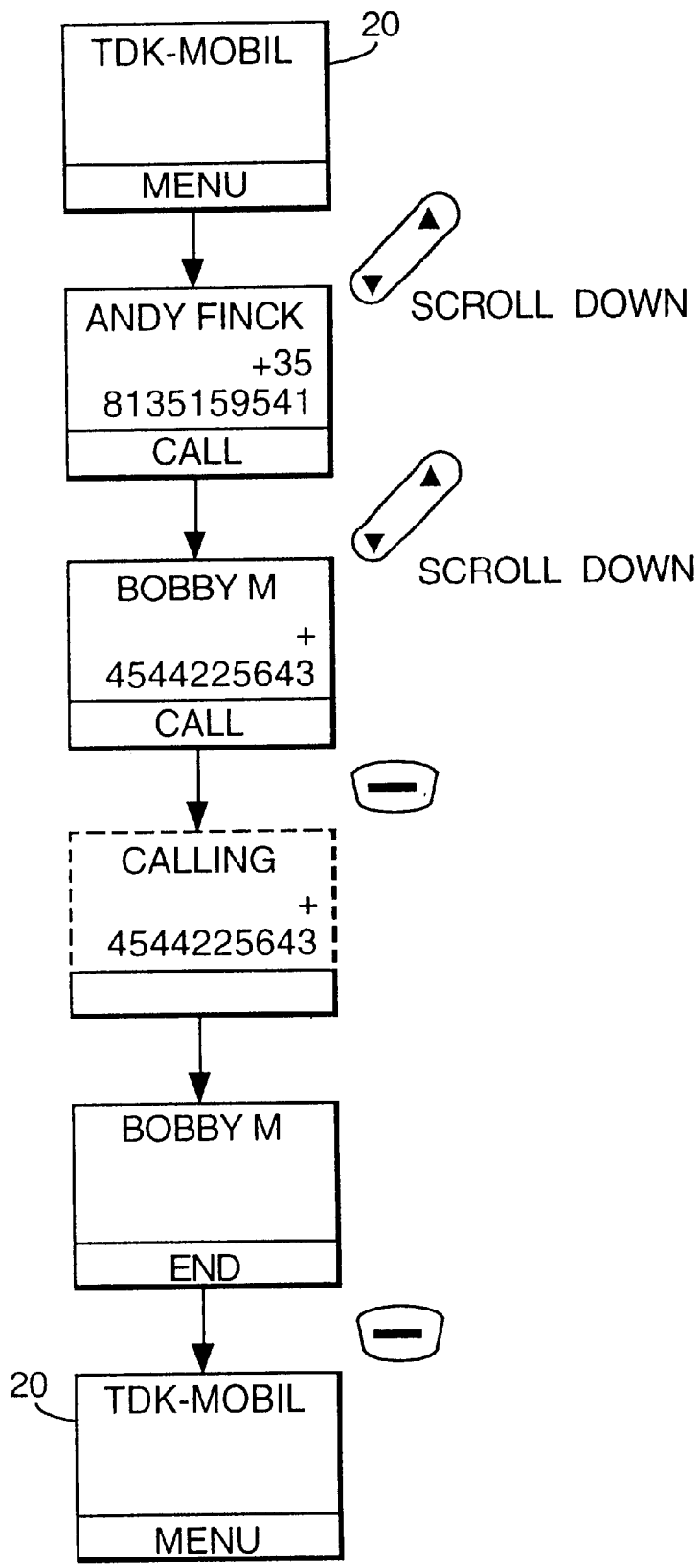
FIG. 5 shows another sequence of display images in connection with call establishment.

FIG. 5 shows a corresponding scenario; here, the user decides to use the scroll key 9 from the idle mode display image 20 to gain access to the phonebook of the telephone under the main menu loop, which causes the telephone number and the name code of the first storage location in the phonebook to be displayed in the display. The telephone changes to the "number handling state", and the new default function "call" of the operation key 8 is now displayed in the soft key display 21. By continued use of the scroll key 9 the user will be able to scroll through the phonebook until he finds the number he wants. As the operation key 8 maintains its "call" function as the default function, the call can still be established by depression of the operation key 8. Then, the call can be established and terminated, as explained in connection with FIG. 4.

Figure 6:
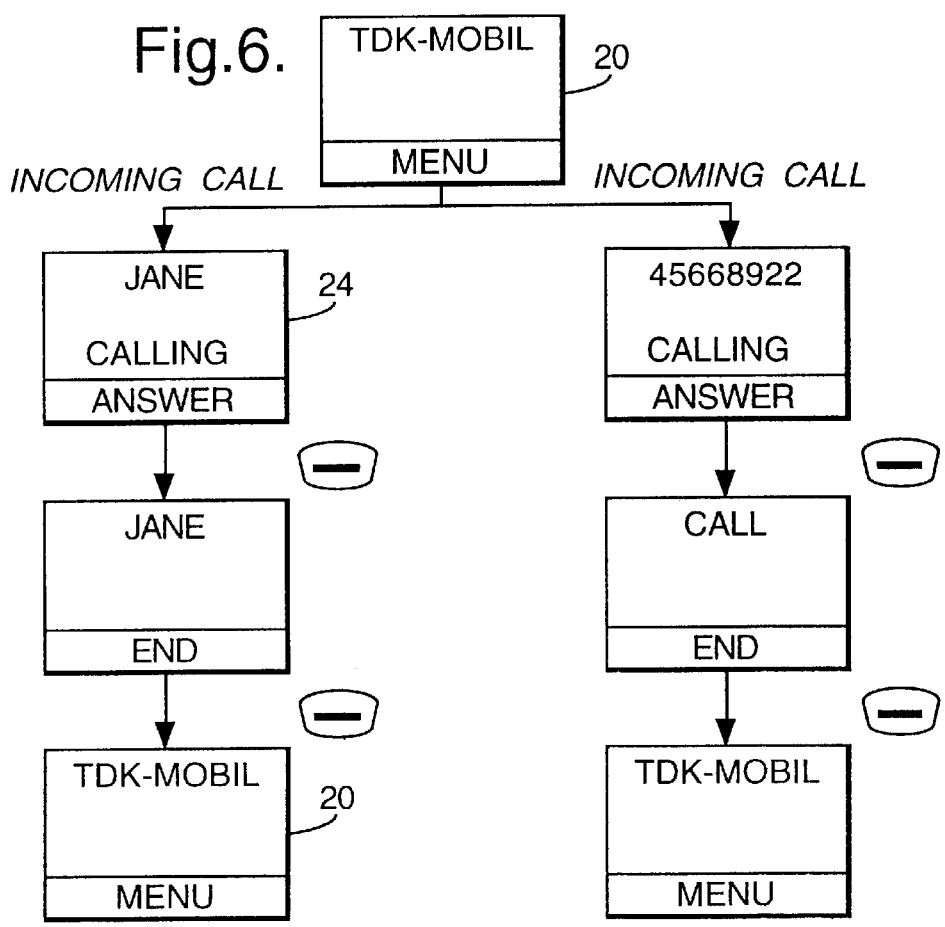
FIG. 6 shows a sequence of display images in connection with call answer.

FIG. 6 shows how an incoming call is displayed. When the telephone records an incoming call, the processor 10 detects this as a non user event, and the telephone changes from the "idle mode state" to an "incoming call state", so that the display image 20 is replaced by a new display image 24. The calling telephone is identified by telephone number (right branch) or name code (left branch), if it is recognized from the phonebook of the telephone. In some cases the calling telephone cannot be identified, and the identification field will therefore be empty (not shown). The operation key 8 will simultaneously assume a new default function under the control of the processor 10, and the new default function will answer the call ("answer") in the preferred embodiment. When the call has been established, the telephone changes to the "call established state", and the display displays the name code of the calling telephone or merely indicates that a call takes place if the name code is not recognized. In this state, the default function of the operation key 8 is "end", and it continues to be displayed in the soft key display 21. If the operation key 8 is activated, the call will be interrupted, and the telephone will return to the "idle mode state"with the idle mode display image 20.

Figure 7:
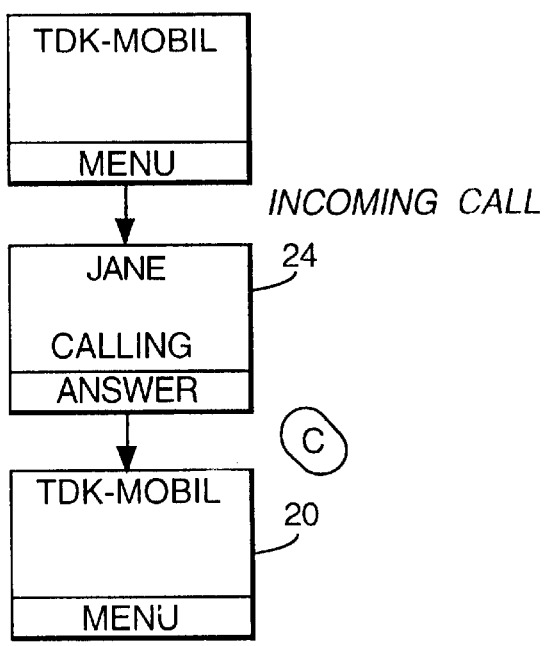
FIG. 7 shows a sequence of display images in connection with call rejection.

FIG. 7 correspondingly shows how the display image 20, 24 changes when an incoming call is detected and the telephone changes to the "incoming call state" with the default function "answer".If the user does not want to answer the call, he can reject the call by depressing the c key or divert the call to his voice mail, if he has such a feature. The telephone then returns to the "idle mode state" with the idle mode display image 20.

Figure 9:
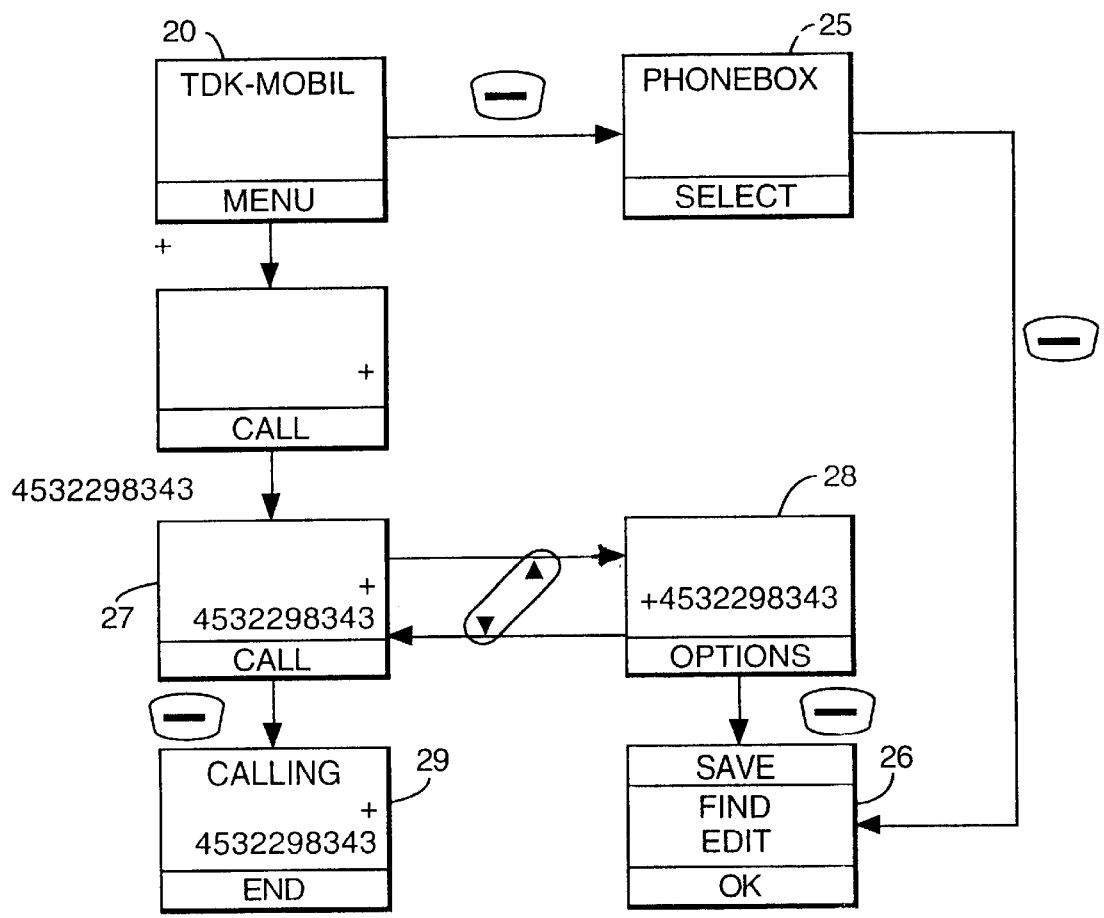
FIG. 9 shows a sequence of display images in connection with call establishment and access to the phonebook.

FIG. 9 shows how it is possible to change from the "idle mode state" with the display image 20 (idle mode display) to a main menu by activating the operation key 8. Here, access to the phonebook is presented as default. If the user selects this, he may choose between the individual submenu items in the phonebook via the display image 26. If, in the "idle mode state", the user had instead begun to enter a telephone number, the telephone would have changed to a "number handling state" with a display image 27 with "call" as the default function. The user may switch to possible functions in this state (display image 28) by means of the scroll key 9, and these functions comprise the submenu items (display image 26) of the phonebook. If, instead, the user had selected the default function in the "number handling state", the telephone would have started establishment of a call (display image 29).

Figure 8:
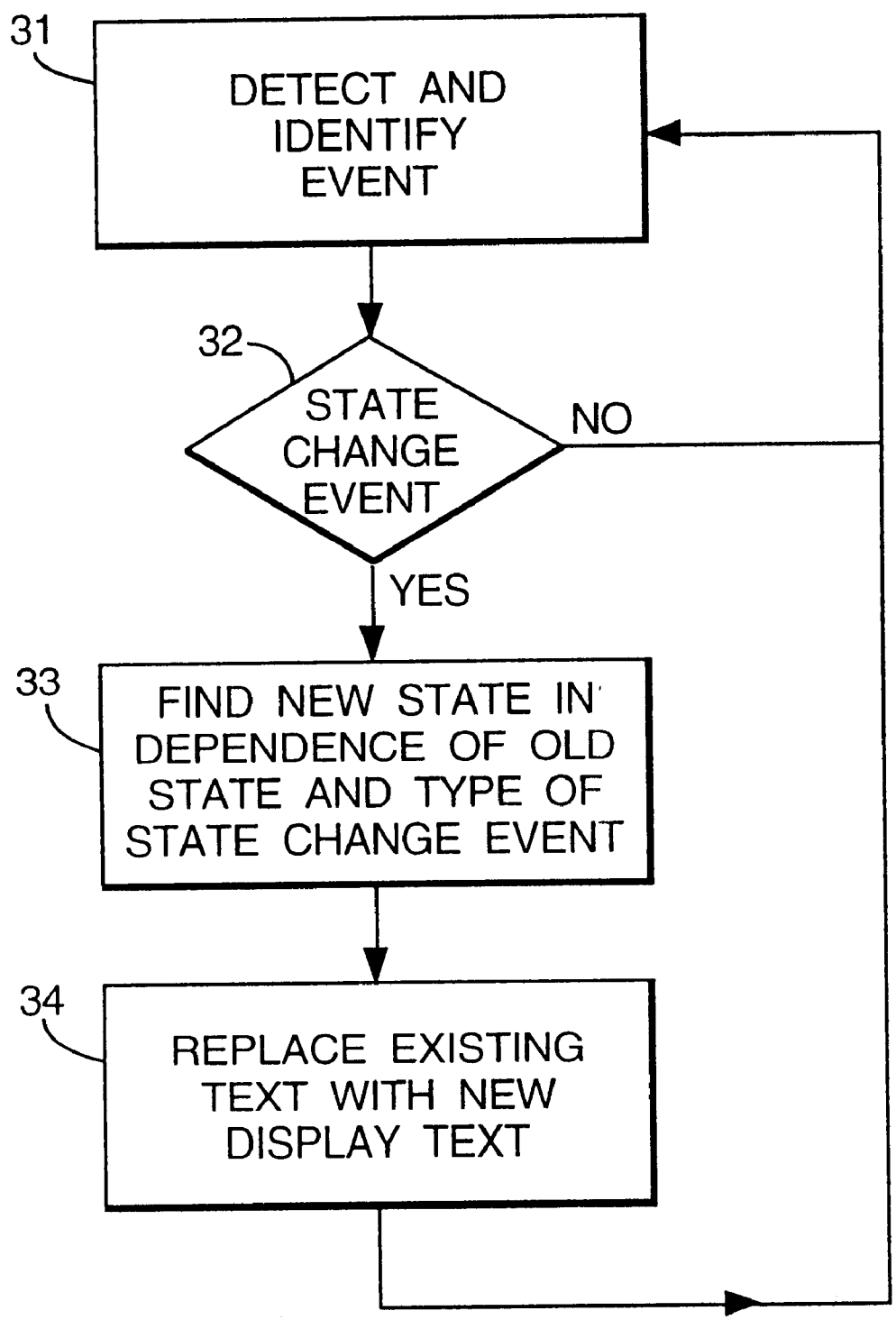
FIG. 8 shows a flow diagram illustrating the decision processes in the controller unit in a telephone in accordance with the invention.

When the telephone is in idle mode, it communicates with a fixed station at regular intervals via paging messages to maintain the connection, and it monitors its peripheral units in the form of battery, keypad, etc. It is the microprocessor 10 which controls these activities, and when it detects an event, it checks whether the telephone is to change its state, e.g. from the "idle mode state" to the "incoming call state". FIG. 8 illustrates this process, where the processor in stage 31 monitors and detects occurring events. If a detected event is not a state change event, the processor returns to the search stage and searches for a new event. If the processor identifies the event as a state change event in the decision stage 32, the processor identifies the new state in stage 33, which takes place by means of a state tree, and replaces the old display text by a new default function indication of the new text, which takes place in stage 34.

Although it is shown in the preferred embodiment that the functions of the telephone might very well be controlled by a single operation key, it may be found expedient in some cases to use two or more operation keys in the second group of keys, optionally integrated in a touch-sensitive display.

In view of the foregoing description it will be evident to a person skilled in the art that various modifications may be made within the scope of the invention.

The scope of the present disclosure includes any novel feature or combination of features disclosed therein either explicitly or implicitly or any generalization thereof irrespective of whether or not it relates to the claimed invention or mitigates any or all of the problems addressed by the present invention. The applicant hereby gives notice that new claims may be formulated to such features during prosecution of this application or of any such further application derived therefrom.

What is claimed is:

1. A radiotelephone comprising a user interface and a controller unit connected to the user interface, said user interface comprising:

a display and a keypad having an operation key whose function is controlled by the controller unit and is displayed in the display;

said radiotelephone being capable of assuming a plurality of states in which a group of predetermined actions associated with the state concerned may be performed by means of said operation key;

said controller unit dedicates an action from said group of actions as a default function for the operation key by recording a frequency of use of each function of the phone in each state of the phone and selecting a most frequently used function for each state of the phone to be a predetermined default function for that state;

a scroll key to scroll between actions included in said group of actions available for said operation key; and said controller unit displays the action presently dedicated to the operation key.

2. A radiotelephone according to claim 1, wherein said operation key, responsive to the state assumed by said radio telephone, is capable of either initiating a call or terminating a call.

3. A radiophone according to claim 1, wherein the keypad comprises a first group of keys and a second group of keys comprising said at least one operation key, and wherein, upon change of telephone states, the controller unit redefines the function of the second group of keys and displays the default function of the operation key in said predetermined area of the display.

4. A radiophone according to claim 3, wherein the first group of keys are alphanumerical keys, and wherein the controller unit determines whether the individual keys in the first group of keys are in numerical or alphabetic mode depending on the present state of the telephone.

5. A radiophone according to claim 1, wherein the controller unit, upon detection of a state change event, changes the state of the telephone and redefines the function of said at least one operation key in response to the preceding state and the nature of the detected state change event.

6. A radiotelephone according to claim 5, wherein the second group of keys, in addition to said at least one operation key and said scroll key, comprises an erase key to erase one or more entered characters.

7. A radiophone according to claim 6, wherein the controller unit, upon telephone state change, redefines the function of the scroll key so that, when the default function of the operation key is displayed in said predetermined area of the display, it will switch between the default function of the operation key and the group of functions to which the default function belongs.

8. A radiophone according to claim 6, wherein, during a call and upon detection of an incoming call, the controller unit changes the function of the erase key from erasing entered characters to interrupting the ongoing call or to rejecting the incoming call.

9. A user interface for a radiotelephone comprising:

a display having a first display section and a second display section;

a keypad including an alphanumeric set of keys and an operation key operatively connected to the display, the operation key being associated with an action of the phone being displayed in the second display section;

a controller unit adapted to receive inputs from the keypad and to control the display, the controller adapted to:

detect an occurrence of a state change event in the phone and to change a state of the phone in response to the state change even;

record a frequency of use of each function of the phone in each state of the phone and select a most frequently used function for each state of the phone to be the predetermined default function for that state; and assign the pre-determined default action of the phone associated with the state of the phone to the operation key and display the pre-determined default action of the phone associated with the state of the phone to the operation key will cause the phone to perform the default action.

10. The user interface of claim 9 wherein the phone is adapted to assume a plurality of states, each state having a pre-determined group of actions associated with the state and wherein one action from the group is the pre-determined default action.

11. The user interface of claim 9 further comprising a scroll key adapted to toggle a function associated with the operation key between the default action and an action selected from a menu of actions associated with the phone.

12. The user interface of claim 9 wherein the operation key is activated to perform the action displayed in the second display by a single activation of the operation key.

13. The user interface of claim 9 wherein the second display identifies to the user the action to be performed by the phone corresponding to a present state of the phone in response to a single activation of the operation key.

14. The user interface of claim 9 wherein the controller unit is adapted to redefine a function of the operation key in response to the occurrence of the state change event.

15. The user interface of claim 9 wherein the controller unit is adapted to redefine a function of the scroll key in response to the occurrence of state change event, wherein when the default function associated with the present state of the phone is displayed, the scroll key, when activated, is adapted to switch the function of the operation key between the default function and a group of functions associated with the default function.

16. The user interface of claim 10, further comprising an erase key adapted to erase one or more characters inputted into the phone when activated, wherein during a call and upon detection of an incoming call, the controller unit is adapted to redefine a function of the erase key from erasing characters to interrupting the call or to rejecting the incoming call.

17. A method of activating a function of a phone comprising the steps of:

monitoring a present state of the phone;

detecting an occurrence of a state change event in the phone;

changing a state of the phone from the present state to a new state associated with the state change event;

changing a display component associated with an operation key of the phone to display a pre-determined default function associated with the new state of the phone, wherein the predetermined default function of the phone is determined by:

recording a frequency of use of each function of the phone in each state of the phone; and selecting a most frequently used function for each state of the phone to be the predetermined default function for that state; and wherein a single activation of the operation key will cause the phone to perform the pre-determined default function displayed in the display component.

18. The method of claim 25 wherein the phone detect an incoming phone call as the occurrence of the state change event in the phone, and changes the display component of the phone to display a text message entitled "ANSWER", wherein a single activation of the operation key will cause the phone to answer the incoming phone call.

19. The method of claim 17 wherein the phone detects an inputting of a phone number to be dialed as the state change event and changes the display component to display a text message entitled "CALL" wherein a single activation of the operation key will cause the phone to dial the number inputted.

20. The method of claim 17 wherein the phone detects a connection with a called number as the state change event and changes the display component to display a text message entitled "END" wherein a single activation of the operation key will cause the phone to terminate the connection.

21. The method of claim 17 wherein when the phone detects the state change event, the display component displays to the user a complementary action that the phone can perform to respond to the state change event by a single activation of the operation key.

22. The method of claim 17 wherein when the present state of the phone is defined as "Established Call" the default function of the operation key is defined as "End".

23. The method of claim 17 wherein the default function for each state of the phone is defined during programming of the phone.

* * * * *

UNITED STATES PATENT AND TRADEMARK OFFICE
CERTIFICATE OF CORRECTION

PATENT NO.    : 6,453,179 B1
DATED         : September 17, 2002
INVENTOR(S)   : Larsen It is certified that error appears in the above-identified patent and that said Letters Patent is hereby corrected as shown below:

Column 8,
Line 44, "claim 10" should read -- claim 9 --.

Column 9,
Line 3, "claim 25" should read -- claim 17 --.

Signed and Sealed this

Eighth Day of July, 2003

JAMES E. ROGAN
*Director of the United States Patent and Trademark Office*